(12) United States Patent
Zhang

(10) Patent No.: US 9,678,632 B2
(45) Date of Patent: Jun. 13, 2017

(54) DATA PROCESSING METHOD AND APPARATUS

(71) Applicant: Huawei Device Co., Ltd., Shenzhen (CN)

(72) Inventor: Jun Zhang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 191 days.

(21) Appl. No.: 14/512,784

(22) Filed: Oct. 13, 2014

(65) Prior Publication Data

US 2015/0033182 A1 Jan. 29, 2015

Related U.S. Application Data

(63) Continuation of application No. PCT/CN2013/074050, filed on Apr. 11, 2013.

(30) Foreign Application Priority Data

Apr. 13, 2012 (CN) .......................... 2012 1 0107635

(51) Int. Cl.
*G06F 3/0483* (2013.01)
*G06F 9/44* (2006.01)

(52) U.S. Cl.
CPC .......... *G06F 3/0483* (2013.01); *G06F 9/4406* (2013.01); *G06F 9/4443* (2013.01)

(58) Field of Classification Search
None
See application file for complete search history.

(56) References Cited

U.S. PATENT DOCUMENTS 5,574,851 A * 11/1996 Rathunde .............. G06F 3/0604
711/114
7,536,585 B1 * 5/2009 Keeton .................. G06F 11/008
714/33

(Continued)

FOREIGN PATENT DOCUMENTS

CN 101078986 A 11/2007
CN 101192129 A 6/2008

(Continued)

OTHER PUBLICATIONS

Foreign Communication From a Counterpart Application, European Application No. 13775828.0, European Office Action dated Oct. 17, 2016, 8 pages.

(Continued)

*Primary Examiner* — H S Sough
*Assistant Examiner* — Phuong N Hoang
(74) *Attorney, Agent, or Firm* — Conley Rose, P.C.

(57) ABSTRACT

A data processing method includes obtaining a path setting parameter and a display window setting parameter of a desktop child window, where the path setting parameter includes a save path of one or more objects inside the desktop child window in a non-system partition, and the display window setting parameter includes a display window size, a display position, and a display manner; creating a desktop child window operation thread; generating, by using the desktop child window operation thread, a desktop child window corresponding to the display window setting parameter, and pointing an object operation pointer of the desktop child window to a storage area corresponding to the path setting parameter in the non-system partition; and injecting the desktop child window operation thread into a system desktop operation thread that is currently running on (Continued)

an operating system, so as to display the desktop child window on a system desktop.

14 Claims, 5 Drawing Sheets

(56) References Cited

U.S. PATENT DOCUMENTS

| | | | | |
|---|---|---|---|---|
| 7,552,358 | B1* | 6/2009 | Asgar-Deen | G06F 11/1435 714/15 |
| 8,745,442 | B1* | 6/2014 | Havemose | G06F 11/1438 714/13 |
| 2002/0036661 | A1 | 3/2002 | Minoura et al. | |
| 2003/0037211 | A1* | 2/2003 | Winokur | G06F 11/1456 711/162 |
| 2004/0165008 | A1* | 8/2004 | Levine | G06F 9/4443 715/789 |
| 2007/0150900 | A1 | 6/2007 | Hankins et al. | |
| 2008/0229224 | A1 | 9/2008 | Kake | |

FOREIGN PATENT DOCUMENTS

| | | |
|---|---|---|
| CN | 101227630 A | 7/2008 |
| CN | 101593256 A | 12/2009 |
| CN | 102279694 A | 12/2011 |
| CN | 102394859 A | 3/2012 |
| CN | 102662591 A | 9/2012 |

OTHER PUBLICATIONS

Partial English Translation and Abstract of Chinese Patent Application No. CN101192129A, Dec. 19, 2014, 17 pages.
Partial English Translation and Abstract of Chinese Patent Application No. CN101078986A, Dec. 19, 2014, 5 pages.
Foreign Communication From a Counterpart Application, PCT Application No. PCT/CN2013/074050, English Translation of International Search Report dated Jul. 11, 2013, 2 pages.
Foreign Communication From a Counterpart Application, PCT Application No. PCT/CN2013/074050, English Translation of Written Opinion dated Jul. 11, 2013, 6 pages.

* cited by examiner

DATA PROCESSING METHOD AND APPARATUS

CROSS-REFERENCE TO RELATED APPLICATION

This application is a continuation of International Application No. PCT/CN2013/074050, filed on Apr. 11, 2013, which claims priority to Chinese Patent Application No. 201210107635.2, filed on Apr. 13, 2012, both of which are hereby incorporated by reference in their entireties.

TECHNICAL FIELD

Embodiments of the present invention relate to computer technologies, and in particular, to a data processing method and apparatus.

BACKGROUND

Electronic products such as personal computers (PC), tablet computers, and smart phones are increasingly popular. An operating system (OS) with a graphical user interface (GUI) is generally installed on these electronic products.

A system desktop is a first screen area that a user sees after logging in to an operating system, and has characteristics such as being visualized and being convenient for access. Some users are used to performing operation of a desktop file on the system desktop, for example, operations such as creating an object, copying-pasting an object, cutting-pasting an object, and saving an object. After a user triggers these operations, a data storage path of an operated object is a partition on a disk to which the system desktop points, used to store an operating system file, that is, a system partition of the disk. If an operating system needs to be reinstalled or restored due to a reason such as a crash of the operating system, data in the system partition is overwritten. As a result, data relevant to the system desktop of the original operating system is lost and the lost data cannot be recovered, thereby bringing a loss to the user.

The prior art can establish an object in a non-system partition of a disk, and create a shortcut of the object on a system desktop, so as to establish an access link from the system desktop to the non-system partition where the object is actually located. The user can click an icon that indicates a shortcut of an object on the system desktop to link to a non-system partition where the object is located, and perform a corresponding operation on the object in the non-system partition. The prior art can prevent data relevant to the object from being lost when the operating system is reinstalled or restored. However, the prior art needs to separately create a shortcut for each object, which is complicated; and the shortcut is presented in a form of an icon, and when performing an operation such as object copying, the user may possibly mistaken the icon of the shortcut that indicates the object for the object itself, and copy or send the icon, thereby causing misoperation.

SUMMARY

Embodiments of the present invention provide a data processing method and apparatus, so as to reduce probabilities of data loss and user misoperation while ensuring convenience for a user to perform an object operation.

An embodiment of the present invention provides a data processing method, including obtaining a path setting parameter and a display window setting parameter of a desktop child window, where the path setting parameter includes a save path of one or more objects inside the desktop child window in a non-system partition; and the display window setting parameter is used to indicate a display attribute of the desktop child window; creating a desktop child window operation thread; generating, by using the desktop child window operation thread, a desktop child window corresponding to the display window setting parameter, and pointing an object operation pointer of the desktop child window to a storage area corresponding to the path setting parameter in the non-system partition; and injecting the desktop child window operation thread into a system desktop operation thread that is currently running on an operating system, so as to display the desktop child window on a system desktop.

An embodiment of the present invention further provides a data processing apparatus, including an obtaining module, configured to obtain a path setting parameter and a display window setting parameter of a desktop child window, where the path setting parameter includes a save path of one or more objects inside the desktop child window in a non-system partition; and the display window setting parameter is used to indicate a display attribute of the desktop child window; a first controlling module, configured to create a desktop child window operation thread; generate, by using the desktop child window operation thread, a desktop child window corresponding to the display window setting parameter, and point an object operation pointer of the desktop child window to an area corresponding to the path setting parameter in the non-system partition; and a displaying module, configured to inject the desktop child window operation thread into a system desktop operation thread that is currently running on an operating system, so as to display the desktop child window on a system desktop.

In the foregoing technical solutions, the desktop child window is created on the system desktop, and the object operation pointer of the desktop child window points to the non-system partition of the disk; therefore, the desktop child window can meet an application requirement of a user to perform an object operation on the system desktop that the user first sees after logging in to the operating system, which improves convenience for the user to perform data processing; in addition, data of an object of the desktop child window will not be lost due to a reason such as reinstallation or restoration of the operating system, thereby reducing the probability of data loss. Further, the desktop child window is presented on the system desktop in a form of a window but not in a form of an icon that indicates a shortcut, thereby reducing the probability of misoperation occurring when the user performs an operation such as object copying or sending in the desktop child window.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

In the embodiments of the present invention, a system desktop is a desktop environment provided by an operating system, and is a first screen area that a user sees after logging in to the operating system. An operation route to which the system desktop points is a system partition of a disk, where the system partition of a disk is a disk area where a system file of the operating system is installed on an electronic product; and a disk area of the disk other than the system area is a non-system partition. When the operating system is reinstalled or restored on the electronic product, the operating system that is reinstalled or restored overwrites data in the system partition, and therefore the data stored in the system partition is deleted and cannot be recovered, but data in the non-system partition is not overwritten by the operating system that is reinstalled or restored.

Figure 1:
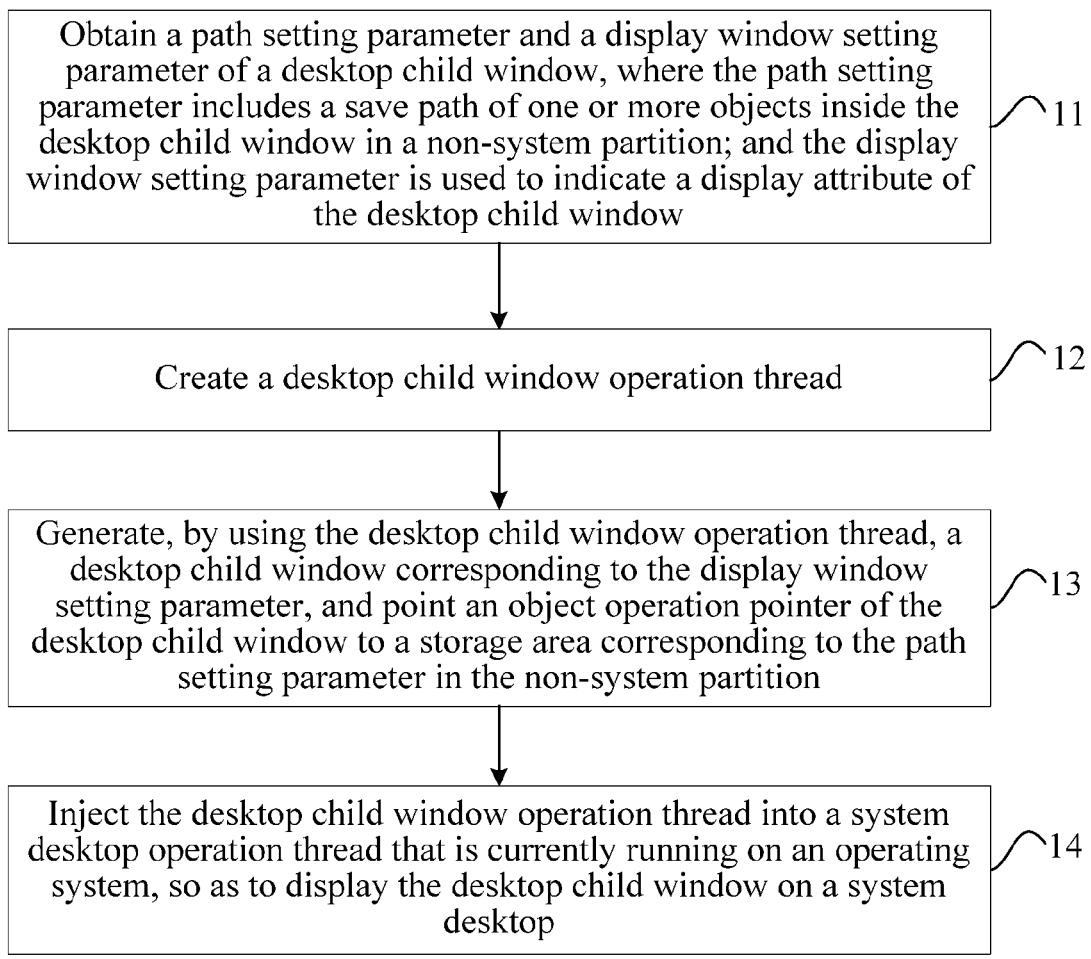
FIG. 1 is a flowchart of a data processing method according to an embodiment of the present invention.

FIG. 1 is a flowchart of a data processing method according to an embodiment of the present invention. The method shown in FIG. 1 includes:

11: Obtain a path setting parameter and a display window setting parameter of a desktop child window, where the path setting parameter includes a save path of one or more objects inside the desktop child window in a non-system partition; and the display window setting parameter is used to indicate a display attribute of the desktop child window.

A user may set a parameter, such as path and display, of the desktop child window according to an actual requirement. The path setting parameter of the desktop child window is used to set a save path of each object inside the desktop child window in the non-system partition; and the display window setting parameter of the desktop child window is used to set the display attribute of the desktop child window.

12: Create a desktop child window operation thread.

The desktop child window operation thread is used to perform operation relevant to the desktop child window.

13: Generate, by using the desktop child window operation thread, a desktop child window corresponding to the display window setting parameter, and point an object operation pointer of the desktop child window to a storage area corresponding to the path setting parameter in the non-system partition.

After the desktop child window operation thread is created, the desktop child window operation thread may generate the desktop child window according to the display window setting parameter, and point the object operation pointer of the desktop child window to the storage area corresponding to the path setting parameter in the non-system partition.

14: Inject the desktop child window operation thread into a system desktop operation thread that is currently running on an operating system, so as to display the desktop child window on a system desktop.

Thread injection is a special term for operating systems. A meaning of thread injection is that a thread is inserted into another thread, and a resource of the another thread into which the thread is inserted is used to execute the thread that is inserted, so as to concurrently execute tasks of the another thread into which the thread is inserted and the thread that is inserted. This embodiment may obtain a system desktop operation thread that is currently running on the operating system, inject the desktop child window operation thread into the system desktop operation thread, and execute the desktop child window operation thread by using the system desktop operation thread, thereby achieving an objective of displaying the desktop child window on the system desktop.

Figure 2:
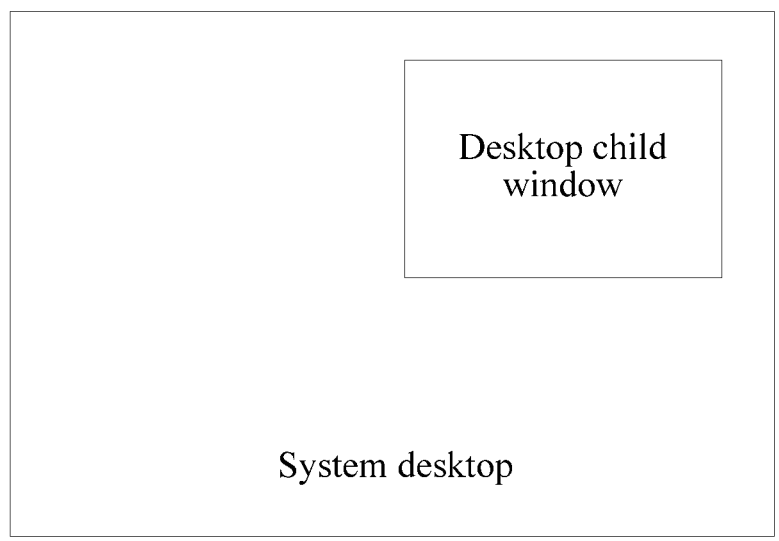
FIG. 2 is an example of an expansion display of a desktop child window on a system desktop according to an embodiment of the present invention.
Figure 3:
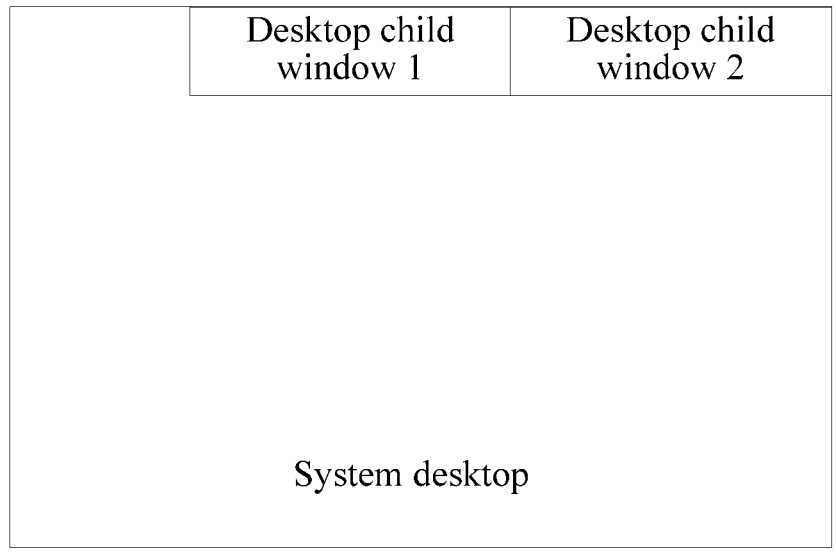
FIG. 3 is an example of a tab display of a desktop child window on a system desktop according to an embodiment of the present invention.

Optionally, the display attribute of the desktop child window may include parameters such as a window size, a display position, and a display manner; where the display window size is smaller than or equal to a size of the system desktop, the display position is coordinates of a display screen used for displaying the desktop child window, and the display manner may include an expansion display manner or a tab display manner, and so on. An optional display example of the desktop child window when the display manner is the expansion display manner is shown in FIG. 2; and an optional display example of the desktop child window when the display manner is the tab display manner is shown in FIG. 3. Different desktop child windows may be respectively generated by creating multiple desktop child window threads on the system desktop. FIG. 3 shows an example of displaying 2 desktop child windows on the system desktop.

A difference between a desktop child window and a shortcut on the system desktop is that the desktop child window is not an icon, but is an operation window that is displayed in an embedded manner on the system desktop, and a directory for storing an object of the desktop child window is a non-system partition of a disk; and a user may perform an operation, such as saving an object or deleting an object, by using a created desktop child window. When the user performs an operation, such as saving an object or deleting an object by using the created desktop child window, data of an operated object in the non-system partition to which the object operation pointer of the desktop child window points changes accordingly.

In the data processing method provided by this embodiment, the desktop child window is created on the system desktop, and the object operation pointer of the desktop child window points to the non-system partition of the disk; therefore, the desktop child window can meet an application requirement of a user to perform an object operation on the system desktop that the user first sees after logging in to the operating system, which improves convenience for the user to perform data processing; in addition, data of an object of the desktop child window will not be lost due to a reason such as reinstallation or restoration of the operating system, thereby reducing the probability of data loss. Further, the desktop child window is presented on the system desktop in a form of a window but not in a form of an icon that indicates a shortcut, thereby reducing the probability of misoperation occurring when the user performs an operation such as object copying or sending in the desktop child window.

Based on the forgoing technical solution, optionally, an object operation instruction relevant to the desktop child window may be collected, and an operation, which is corresponding to the object operation instruction, may be performed in the desktop child window by using the desktop child window operation thread.

For example, the user may increase or decrease a size of a display area of the desktop child window, so as to adjust a display position of the desktop child window on the system desktop. In this case, the collected operation instruction of the user is to adjust the display attribute of the desktop child window, the display window setting parameter may be updated according to the operation instruction by using the desktop child window operation thread, so as to update and display the desktop child window on the system desktop.

Figure 4:
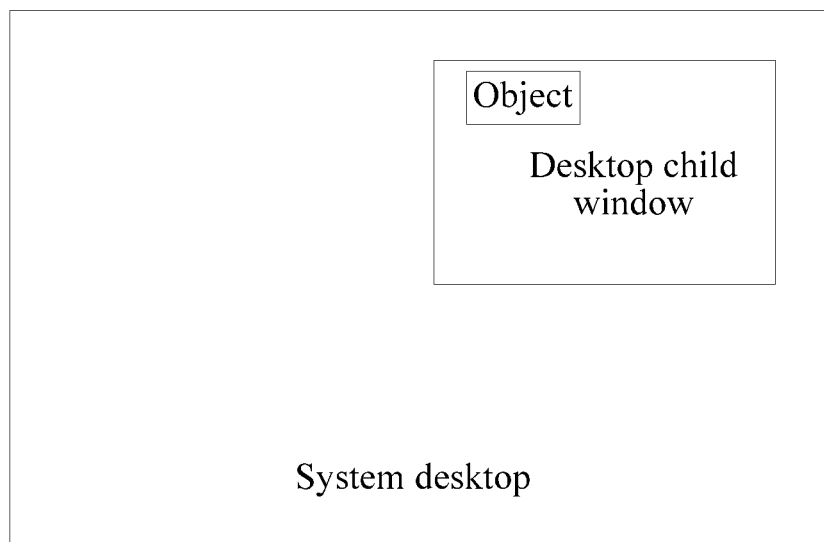
FIG. 4 is an example of saving an object in a desktop child window according to an embodiment of the present invention.
Figure 5:
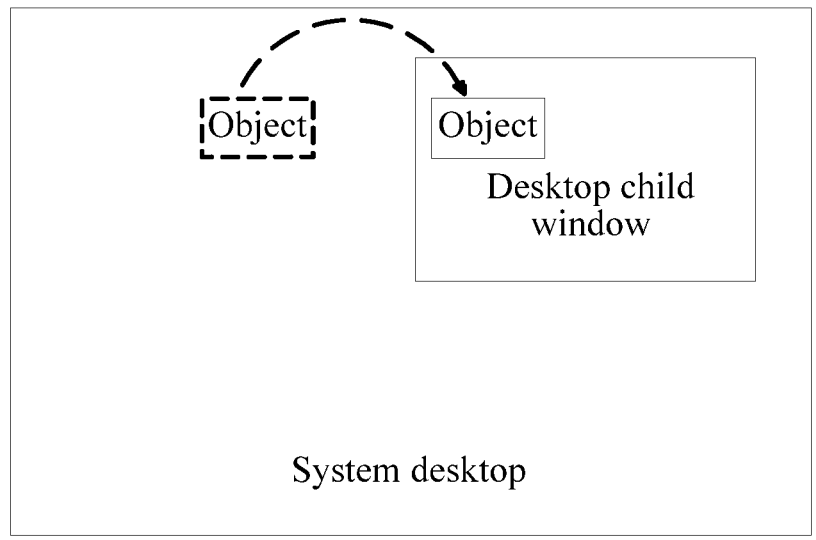
FIG. 5 is an example of dragging an object from a system desktop to a desktop child window according to an embodiment of the present invention.
Figure 6:
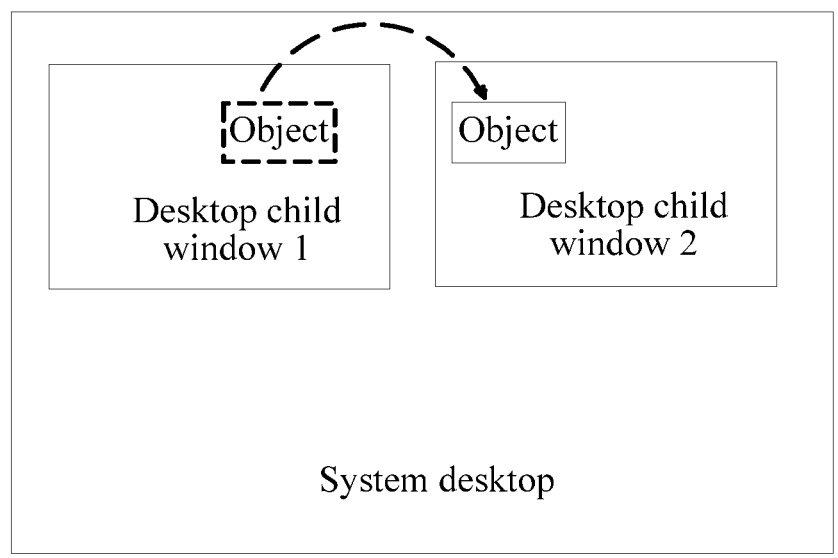
FIG. 6 is an example of dragging an object between desktop child windows according to an embodiment of the present invention.

For another example, the user may save an object in the desktop child window. In this case, the collected operation instruction of the user is to save an object in the desktop child window, and a to-be-saved object may be saved, by using the desktop child window operation thread, to the storage area to which the object operation pointer of the desktop child window points. Optionally, the to-be-saved object is an object in a desktop child window, and an optional application example is shown in FIG. 4; or, the to-be-saved object is an object of a system desktop, and an optional application example is shown in FIG. 5, for example, a user may drag an object of a system desktop into a desktop child window, and in this case, an operation process of the desktop child window may obtain the dragged object from a system partition to which the system desktop points, and save the object to a non-system partition to which an object operation pointer of the desktop child window points; or the to-be-saved object is an object of another desktop child window that is displayed in an embedded manner on a system desktop, and an optional application example is shown in FIG. 6, for example, a user may drag an object of a desktop child window 1 into a desktop child window 2, and in this case, an operation process of the desktop child window 2 may obtain the dragged object from a non-system partition to which an object operation pointer of the desktop child window 1 points, and save the object to a non-system partition to which an object operation pointer of the desktop child window 2 points.

For another example, the user may delete an object in the desktop child window. In this case, the collected operation instruction of the user is to delete an object in the desktop child window, and the corresponding object may be deleted, by using the desktop child window operation thread, from the non-system partition to which the object operation pointer of the desktop child window points.

Figure 7:
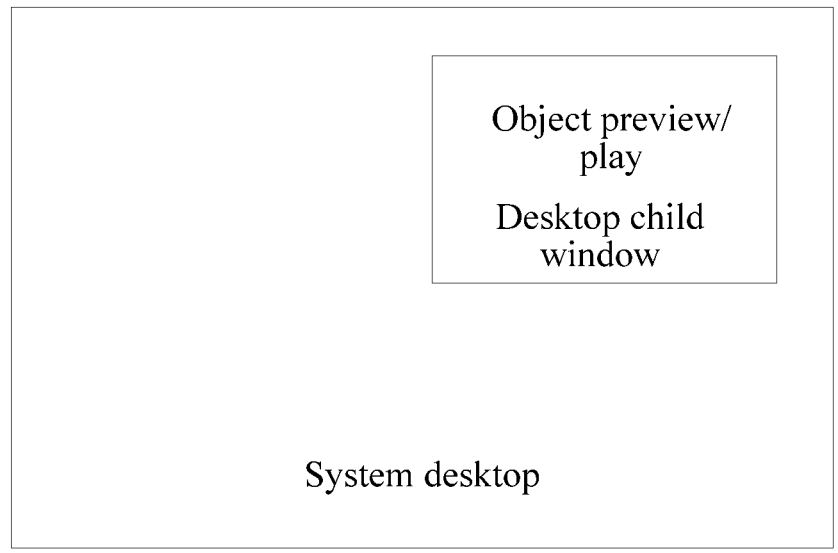
FIG. 7 is an example of previewing or playing an object in a desktop child window according to an embodiment of the present invention.

For another example, the user may preview or play an object in the desktop child window. In this case, the collected operation instruction is to preview or play an operation object in the desktop child window, and a preview or play application thread may be loaded by using the desktop child window operation thread, and then an object to which the operation instruction points may be previewed or played in the desktop child window by using the preview or play application thread; an optional application example is shown in FIG. 7.

The foregoing types of object operation are only exemplary descriptions; the user may further perform object operations, such as object copying and object cutting-pasting, based on the desktop child window, actual paths of the object operations performed by the user all point to the non-system partition to which the object operation pointer of the desktop child window points; implementation manners of the object operations are similar, and are not further described herein.

It needs to be noted that, for the foregoing method embodiments, for the ease of description, each method embodiment is described as a combination of a series of actions, but persons skilled in the art should know that the present invention is not limited by the described action sequences, because according to the present invention, some steps may be performed in another sequence or simultaneously. Secondly, persons of ordinary skill in the art may know that, all the embodiments described in the specification are exemplary embodiments, and the involved actions and modules are not necessarily required by the present invention.

In the foregoing embodiments, the description of each embodiment has different emphasis; and, for content that is not detailed in one embodiment, reference may be made to a relevant description in another embodiment.

Persons of ordinary skill in the art may understand that all or a part of the processes of the foregoing method embodiments may be implemented by a computer program instructing relevant hardware. The foregoing program may be stored in a computer readable storage medium. When the program runs, the steps of the foregoing method embodiments are performed. The foregoing storage medium may include any medium capable of storing program code, such as a read-only memory (ROM), a random access memory (RAM), a magnetic disk, or an optical disc.

Figure 8:
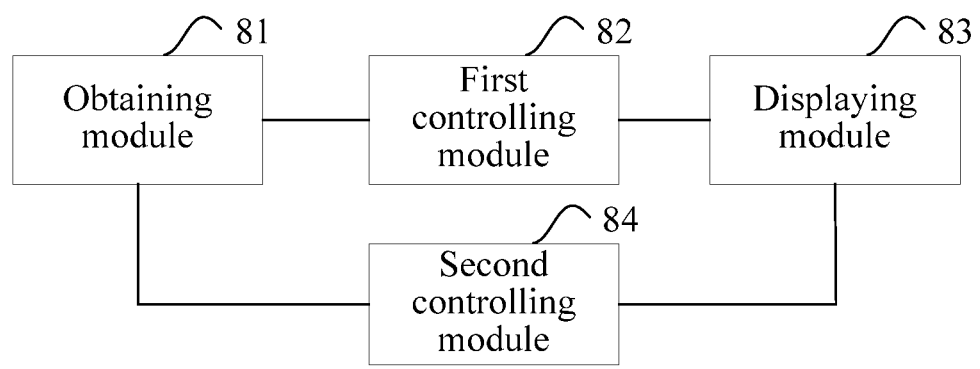
FIG. 8 is a schematic structural diagram of a data processing apparatus according to an embodiment of the present invention.

FIG. 8 is a schematic structural diagram of a data processing apparatus according to an embodiment of the present invention. The data processing apparatus shown in FIG. 8 may act as a desktop child window manager used to implement the data processing method shown in FIG. 1. The data processing apparatus may include, an obtaining module 81, a first controlling module 82, and a displaying module 83.

The obtaining module 81 may be configured to obtain a path setting parameter and a display window setting parameter of a desktop child window, where the path setting parameter includes a save path of one or more objects inside the desktop child window in a non-system partition. The display window setting parameter is used to indicate a display attribute of the desktop child window.

In an embodiment of the present invention, the display attribute of the desktop child window may include a display window size, a display position, and a display manner, where the display manner includes an expansion display manner or a tab display manner, the display window size is smaller than or equal to a size of the system desktop, and the display position is coordinates of a display screen used for displaying the desktop child window.

The first controlling module 82 may be configured to create a desktop child window operation thread; generate, by using the desktop child window operation thread, a desktop child window corresponding to the display window setting parameter, and point an object operation pointer of the desktop child window to a storage area corresponding to the path setting parameter in the non-system partition.

The displaying module 83 may be configured to inject the desktop child window operation thread into a system desktop operation thread that is currently running on an operating system, so as to display the desktop child window on a system desktop.

Based on the forgoing technical solution, optionally, the obtaining module 81 may be further configured to collect an object operation instruction relevant to the desktop child window. The data processing apparatus may further include a second controlling module 84. The second controlling module 84 may be configured to perform an operation, which is corresponding to the object operation instruction, in the desktop child window by using the desktop child window operation thread. For example, the second controlling module 84 may be configured to, when the operation instruction is to adjust the display attribute of the desktop child window, update the display window setting parameter according to the operation instruction by using the desktop child window operation thread, so as to update and display the desktop child window on the system desktop. Or, the second controlling module 84 may be configured to, when the operation instruction is to save an object in the desktop child window, save, by using the desktop child window operation thread, a to-be-saved object to the storage area to which the object operation pointer of the desktop child window points; where the to-be-saved object includes an object of the desktop child window, an object of the system desktop, or an object of another desktop child window displayed on the system desktop. Or, the second controlling module 84 may be configured to, when the operation instruction is to delete an object in the desktop child window, delete from the non-system partition corresponding to the desktop child window, by using the desktop child window operation thread, an operation object to which the operation instruction points. Or, the second controlling module 84 may be configured to, when the operation instruction is to preview or play an operation object in the desktop child window, load a preview or play application thread by using the desktop child window operation thread, and preview or play in the desktop child window, by using the preview or play application thread, an object to which the operation instruction points.

The data processing apparatus provided by this embodiment creates the desktop child window on the system desktop, and the object operation pointer of the desktop child window points to the non-system partition of the disk; therefore, the desktop child window can meet an application requirement of a user to perform an object operation on the system desktop that the user first sees after logging in to the operating system, which improves convenience for the user to perform data processing; in addition, data of an object of the desktop child window will not be lost due to a reason such as reinstallation or restoration of the operating system, thereby reducing the probability of data loss. Further, the desktop child window is presented on the system desktop in a form of a window but not in a form of an icon that indicates a shortcut, thereby reducing the probability of misoperation occurring when the user performs an operation such as object copying or sending in the desktop child window. For a working mechanism of the data processing apparatus provided by this embodiment, reference may be made to corresponding records in the embodiments corresponding to FIG. 1 to FIG. 7, which are not repeated herein.

It may be understood that, the apparatus and method disclosed by the present invention may be implemented in other manners. For example, the apparatus embodiment described above is merely schematic. For example, the division of modules is merely a division of logical functions and there may be other division manners in actual implementation. For example, a plurality of modules may be combined or integrated into another system, or some features may be ignored or not performed. In addition, connections between the displayed or discussed modules or apparatuses may be implemented by using some physical or logical interfaces and the connection form may be an electrical, mechanical, or another form.

The described apparatus embodiment is merely schematic. Modules described as separate components may be or not be physically separated. Components shown as modules may be or not be physical units, that is, they may be integrated or distributed to at least two network units. A part or all of the modules of the at least two network units may be selected according to an actual need to achieve the objective of the solution of this embodiment. Persons of ordinary skill in the art may understand and carry out the solution without creative efforts.

Finally, it should be noted that the foregoing embodiments are merely intended to describe the technical solutions of the present invention but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data processing method comprising:
    obtaining a path setting parameter and a display window setting parameter of a desktop child window, wherein the path setting parameter comprises a save path of one or more objects inside the desktop child window in a non-system partition, and wherein the display window setting parameter is used to indicate a display attribute of the desktop child window;
    creating a desktop child window operation thread;
    generating, by using the desktop child window operation thread, the desktop child window corresponding to the display window setting parameter, and pointing an object operation pointer of the desktop child window to a storage area corresponding to the path setting parameter in the non-system partition; and
    injecting the desktop child window operation thread into a system desktop operation thread that is currently running on an operating system, so as to display the desktop child window on a system desktop.

2. The method according to claim 1, wherein after injecting the desktop child window operation thread into the system desktop operation thread that is currently running on an operating system, the method further comprises:
    obtaining an object operation instruction relevant to the desktop child window; and
    performing an operation, which corresponds to the object operation instruction, in the desktop child window by using the desktop child window operation thread.

3. The method according to claim 2, wherein performing the operation, which corresponds to the object operation instruction, in the desktop child window by using the desktop child window operation thread comprises updating the display window setting parameter according to the operation instruction by using the desktop child window operation thread when the operation instruction is to adjust the display attribute of the desktop child window, so as to update and display the desktop child window on the system desktop.

4. The method according to claim 2, wherein performing the operation, which corresponds to the object operation instruction, in the desktop child window by using the desktop child window operation thread comprises saving, by using the desktop child window operation thread, a to-be-saved object to the storage area to which the object operation pointer of the desktop child window points when the operation instruction is to save an object in the desktop child window, and wherein the to-be-saved object comprises an object of the desktop child window, an object of the system desktop, or an object of another desktop child window displayed on the system desktop.

5. The method according to claim 2, wherein performing the operation, which corresponds to the object operation instruction, in the desktop child window by using the desktop child window operation thread comprises deleting, from the non-system partition corresponding to the desktop child window, by using the desktop child window operation thread, an operation object to which the operation instruction points when the operation instruction is to delete an object in the desktop child window.

6. The method according to claim 2, wherein performing the operation, which corresponds to the object operation instruction, in the desktop child window by using the desktop child window operation thread comprises:
    loading a preview or play application thread by using the desktop child window operation thread when the operation instruction is to preview or play an operation object in the desktop child window; and
    previewing or playing, in the desktop child window, by using the preview or play application thread, an object to which the operation instruction points.

7. The method according to claim 1, wherein the display attribute of the desktop child window comprises a display window size, a display position, and a display manner, wherein the display manner comprises an expansion display manner or a tab display manner, wherein the display window size is smaller than or equal to a size of the system desktop, and wherein the display position is coordinates of a display screen used for displaying the desktop child window.

8. A data processing apparatus, comprising:
    a non-transitory computer readable medium having instructions stored thereon; and
    at least one hardware processor coupled to the non-transitory computer readable medium that executes the instructions to:
        obtain a path setting parameter and a display window setting parameter of a desktop child window, wherein the path setting parameter comprises a save path of one or more objects inside the desktop child window in a non-system partition, and wherein the display window setting parameter is used to indicate a display attribute of the desktop child window;
        create a desktop child window operation thread;
        generate, by using the desktop child window operation thread, a desktop child window corresponding to the display window setting parameter;
        point an object operation pointer of the desktop child window to a storage area corresponding to the path setting parameter in the non-system partition; and
        inject the desktop child window operation thread into a system desktop operation thread that is currently running on an operating system, so as to display the desktop child window on a system desktop.

9. The apparatus according to claim 8, wherein the at least one hardware processor executes the instructions to obtain an object operation instruction relevant to the desktop child window, and to perform an operation, which corresponds to the object operation instruction, in the desktop child window by using the desktop child window operation thread.

10. The apparatus according to claim 9, wherein the at least one hardware processor executes the instructions to, update the display window setting parameter according to the operation instruction by using the desktop child window operation thread when the operation instruction is to adjust the display attribute of the desktop child window, so as to update and display the desktop child window on the system desktop.

11. The apparatus according to claim 9, wherein the at least one hardware processor executes the instructions to save, by using the desktop child window operation thread, a to-be-saved object to the storage area to which the object operation pointer of the desktop child window points when the operation instruction is to save an object in the desktop child window, and wherein the to-be-saved object comprises an object of the desktop child window, an object of the system desktop, or an object of another desktop child window displayed on the system desktop.

12. The apparatus according to claim 9, wherein the at least one hardware processor executes the instructions to delete, from the non-system partition corresponding to the desktop child window and by using the desktop child window operation thread, an operation object to which the operation instruction points when the operation instruction is to delete an object in the desktop child window.

13. The apparatus according to claim 9, wherein the at least one hardware processor executes the instructions to:
    load a preview or play application thread by using the desktop child window operation thread when the operation instruction is to preview or play an operation object in the desktop child window; and
    preview or play, in the desktop child window, by using the preview or play application thread, an object to which the operation instruction points.

14. The apparatus according to claim 8, wherein the display attribute of the desktop child window comprises:
    a display window size;
    a display position; and
    a display manner,
    wherein the display manner comprises an expansion display manner or a tab display manner,
    wherein the display window size is smaller than or equal to a size of the system desktop, and
    wherein the display position is coordinates of a display screen used for displaying the desktop child window.

* * * * *